US011976255B2

(12) United States Patent
Lo et al.

(10) Patent No.: US 11,976,255 B2
(45) Date of Patent: May 7, 2024

(54) SOLIDIFYING LIQUID AMINE OXIDE, BETAINE, AND/OR SULTAINE SURFACTANTS WITH A BINDER AND OPTIONAL CARRIER

(71) Applicant: ECOLAB USA INC., Saint Paul, MN (US)

(72) Inventors: Wendy Lo, Saint Paul, MN (US); Erik C. Olson, Saint Paul, MN (US); Jon D. Hansen, Saint Paul, MN (US); Katherine J. Molinaro, Saint Paul, MN (US); Corey Rosenthal, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

(21) Appl. No.: 18/177,333

(22) Filed: Mar. 2, 2023

(65) Prior Publication Data

US 2023/0220315 A1 Jul. 13, 2023

Related U.S. Application Data

(62) Division of application No. 16/259,015, filed on Jan. 28, 2019, now Pat. No. 11,655,436.

(60) Provisional application No. 62/622,356, filed on Jan. 26, 2018.

(51) Int. Cl.

| | |
|---|---|
| ***C11D 11/00*** | (2006.01) |
| ***C11D 1/75*** | (2006.01) |
| ***C11D 1/83*** | (2006.01) |
| ***C11D 1/90*** | (2006.01) |
| ***C11D 1/92*** | (2006.01) |
| ***C11D 3/04*** | (2006.01) |
| ***C11D 3/10*** | (2006.01) |
| ***C11D 3/20*** | (2006.01) |
| ***C11D 3/22*** | (2006.01) |
| ***C11D 3/32*** | (2006.01) |
| ***C11D 3/34*** | (2006.01) |
| ***C11D 3/37*** | (2006.01) |
| ***C11D 3/38*** | (2006.01) |
| ***C11D 11/02*** | (2006.01) |
| *C11D 1/22* | (2006.01) |
| *C11D 1/94* | (2006.01) |

(52) U.S. Cl.

CPC ............ *C11D 11/0082* (2013.01); *C11D 1/75* (2013.01); *C11D 1/83* (2013.01); *C11D 1/90* (2013.01); *C11D 1/92* (2013.01); *C11D 3/046* (2013.01); *C11D 3/10* (2013.01); *C11D 3/2075* (2013.01); *C11D 3/2079* (2013.01); *C11D 3/222* (2013.01); *C11D 3/323* (2013.01); *C11D 3/3418* (2013.01); *C11D 3/3707* (2013.01); *C11D 3/3749* (2013.01); *C11D 3/3761* (2013.01); *C11D 3/38* (2013.01); *C11D 11/02* (2013.01); *C11D 1/22* (2013.01); *C11D 1/94* (2013.01)

(58) Field of Classification Search

None

See application file for complete search history.

(56) References Cited

U.S. PATENT DOCUMENTS

| | | | |
|---|---|---|---|
| 2,559,583 | A | 7/1951 | Barker |
| 2,559,584 | A | 7/1951 | Barker |
| 2,584,056 | A | 1/1952 | Soule et al. |
| 2,584,057 | A | 1/1952 | Soule et al. |
| 2,665,256 | A | 1/1954 | Barker |
| 2,681,336 | A | 6/1954 | Gorin |
| 2,724,699 | A | 11/1955 | Barker |
| 2,724,700 | A | 11/1955 | Barker |
| 2,927,900 | A | 3/1960 | Shiraeff |
| 3,267,147 | A | 8/1966 | Sheeran |
| 3,316,236 | A | 4/1967 | Starks et al. |
| 3,769,222 | A | 10/1973 | Yurko et al. |
| 3,843,563 | A | 10/1974 | Davies et al. |
| 3,952,080 | A | 4/1976 | Backlund et al. |
| 3,960,955 | A | 6/1976 | Kuntschik et al. |
| 4,054,541 | A | 10/1977 | Mausner et al. |
| 4,126,586 | A | 11/1978 | Curtis et al. |
| 4,165,293 | A | 8/1979 | Gordon |
| 4,446,032 | A | 5/1984 | Munteanu et al. |
| 4,548,744 | A | 10/1985 | Conner |
| 4,944,768 | A | 7/1990 | Balliello et al. |
| 5,057,241 | A | 10/1991 | Merritt et al. |

(Continued)

FOREIGN PATENT DOCUMENTS

| | | |
|---|---|---|
| AU | 8526275 | 4/1977 |
| AU | 2210383 A | 6/1984 |

(Continued)

OTHER PUBLICATIONS

Semenov et al., "Evaporation of Droplets of Surfactant Solutions", Langmuir, vol. 29, pp. 10028-10036, Jul. 12, 2013.

Ecolab USA Inc, PCTUS2019/015367 filed Jan. 28, 2019, "The International Search Report and the Written Opinion of the International Searching Authority, or the Declaration", 18 pages, dated Jun. 26, 2019.

Pan et al., Modern Drying Technology, China, Chemical Industry Press, pp. 896, 1998.

Third Office Action in CN2019800099342, 10 pages, dated May 7, 2022.

(Continued)

*Primary Examiner* — Lorna M Douyon

(74) *Attorney, Agent, or Firm* — McKee, Voorhees & Sease, PLC

(57) ABSTRACT

The invention relates to solidification of liquid amine oxide, betaine, and/or sultaine surfactants with a binder to form a solidified surfactant composition. In particular, the invention relates to solidification of liquid surfactants utilizing drying device(s), wherein the feed composition contains at least one liquid surfactant and a binder and optional carrier to form a solidified surfactant composition. The solidified surfactant compositions can be useful in various cleaning compositions.

22 Claims, 2 Drawing Sheets

(56) References Cited

U.S. PATENT DOCUMENTS

| | | | |
|---|---|---|---|
| 5,268,283 | A | 12/1993 | Mothes et al. |
| 5,382,378 | A | 1/1995 | Guerrini et al. |
| 5,389,306 | A | 2/1995 | Wierenga et al. |
| 5,397,506 | A | 3/1995 | Groth et al. |
| 5,447,651 | A | 9/1995 | Karpusiewicz et al. |
| 5,453,215 | A | 9/1995 | Karpusiewicz et al. |
| 5,496,489 | A | 3/1996 | Dussault et al. |
| 5,516,447 | A | 5/1996 | Bauer et al. |
| 5,629,275 | A | 5/1997 | Bauer et al. |
| 5,770,556 | A | 6/1998 | Farrell et al. |
| 5,858,939 | A | 1/1999 | Tsaur |
| 5,977,183 | A | 11/1999 | Scepanski |
| 5,994,281 | A | 11/1999 | He et al. |
| 6,221,831 | B1 | 4/2001 | Emery et al. |
| 6,274,544 | B1 | 8/2001 | Akkermans et al. |
| 6,387,869 | B2 | 5/2002 | Bauer et al. |
| 6,387,870 | B1 | 5/2002 | Klaers et al. |
| 6,429,184 | B1 | 8/2002 | Akkermans et al. |
| 6,432,906 | B1 | 8/2002 | Carlson et al. |
| 6,455,488 | B1 | 9/2002 | Assmann et al. |
| 6,479,452 | B2 | 11/2002 | Weuthen et al. |
| 6,514,922 | B2 | 2/2003 | Waldrop |
| 6,555,514 | B1 | 4/2003 | Capeci et al. |
| 6,562,776 | B1 | 5/2003 | Smith et al. |
| 6,797,687 | B2 | 9/2004 | Kischkel et al. |
| 6,846,796 | B2 | 1/2005 | Schmid |
| 6,894,018 | B1 | 5/2005 | Beimesch et al. |
| 6,903,065 | B2 | 6/2005 | Nyssen et al. |
| 8,324,147 | B2 | 12/2012 | Kieffer et al. |
| 8,863,686 | B2 | 10/2014 | Ris |
| 9,271,906 | B2 | 3/2016 | Miller et al. |
| 11,214,763 | B2 | 1/2022 | Lo et al. |
| 11,655,436 | B2 | 5/2023 | Lo et al. |
| 2001/0014657 | A1 | 8/2001 | Assmann et al. |
| 2003/0040457 | A1 | 2/2003 | Behler et al. |
| 2003/0050215 | A1 | 3/2003 | Ramanan et al. |
| 2004/0005994 | A1 | 1/2004 | Eskuchen et al. |
| 2004/0029766 | A1 | 2/2004 | Frick et al. |
| 2004/0072715 | A1 | 4/2004 | Griese et al. |
| 2004/0077518 | A1 | 4/2004 | Nishikawa et al. |
| 2004/0102345 | A1 | 5/2004 | Orchowski et al. |
| 2004/0121935 | A1 | 6/2004 | Klaers et al. |
| 2004/0253297 | A1 | 12/2004 | Hedges et al. |
| 2005/0197276 | A1 | 9/2005 | Rigley et al. |
| 2005/0250667 | A1 | 11/2005 | Quellet et al. |
| 2006/0069007 | A1 | 3/2006 | Edward Boucher et al. |
| 2006/0128596 | A1 | 6/2006 | Koshti et al. |
| 2006/0276360 | A1 | 12/2006 | Muradov |
| 2007/0078071 | A1 | 4/2007 | Lee et al. |
| 2007/0111920 | A1 | 5/2007 | Baur et al. |
| 2007/0227557 | A1 | 10/2007 | Ohlhausen et al. |
| 2008/0124598 | A1 | 5/2008 | Backhaus-Ricoult et al. |
| 2008/0261854 | A1 | 10/2008 | Somerville Roberts et al. |
| 2008/0271259 | A1 | 11/2008 | Wang |
| 2008/0293615 | A1 | 11/2008 | Kieffer et al. |
| 2009/0042766 | A1 | 2/2009 | Mayer et al. |
| 2009/0082244 | A1 | 3/2009 | Mayer et al. |
| 2009/0105111 | A1 | 4/2009 | Stolte et al. |
| 2009/0305938 | A1 | 12/2009 | Assmann et al. |
| 2010/0048445 | A1 | 2/2010 | Gerusz et al. |
| 2010/0125957 | A1 | 5/2010 | Hong et al. |
| 2010/0179083 | A1 | 7/2010 | Glenn, Jr. et al. |
| 2010/0286011 | A1 | 11/2010 | Glenn, Jr. et al. |
| 2011/0082066 | A1 | 4/2011 | Wrubbel et al. |
| 2011/0257066 | A1 | 10/2011 | Somerville Roberts et al. |
| 2012/0030882 | A1 | 2/2012 | Wetrosky et al. |
| 2012/0058266 | A1 | 3/2012 | Chambers et al. |
| 2012/0114720 | A1 | 5/2012 | Völkel et al. |
| 2012/0165239 | A1 | 6/2012 | Dreja et al. |
| 2013/0123164 | A1 | 5/2013 | Jones et al. |
| 2013/0172218 | A1 | 7/2013 | Labarca Finol et al. |
| 2015/0104530 | A1 | 4/2015 | Perry |
| 2015/0305395 | A9 | 10/2015 | Kafley |
| 2016/0160156 | A1 | 6/2016 | VanBlarcom et al. |
| 2016/0289599 | A1 | 10/2016 | Constable et al. |
| 2017/0158988 | A1 | 6/2017 | Lo et al. |
| 2018/0023041 | A1 | 1/2018 | Tang et al. |
| 2018/0100124 | A1 | 4/2018 | Piorkowski |
| 2018/0216053 | A1 | 8/2018 | Denome et al. |

FOREIGN PATENT DOCUMENTS

| | | | |
|---|---|---|---|
| AU | 4625785 | B | 5/1986 |
| AU | 199880152 | B2 | 12/1998 |
| AU | 199930074 | B2 | 10/1999 |
| AU | 199959070 | B2 | 3/2000 |
| AU | 2001291676 | B2 | 3/2002 |
| AU | 2003268060 | B2 | 3/2004 |
| AU | 2013202023 | A1 | 4/2013 |
| CA | 2014201 | A1 | 10/1990 |
| CA | 2120708 | A1 | 4/1993 |
| CA | 2348517 | C | 5/2000 |
| CA | 2562737 | A1 | 11/2005 |
| CA | 2634384 | C | 12/2007 |
| CA | 2661141 | A1 | 7/2008 |
| CA | 2752781 | C | 8/2010 |
| CA | 2915717 | A1 | 1/2015 |
| CN | 1070683 | A | 4/1993 |
| CN | 1273525 | A | 11/2000 |
| CN | 1291636 | A | 4/2001 |
| CN | 1643123 | A | 7/2005 |
| CN | 101406817 | A | 4/2009 |
| CN | 101507917 | A | 8/2009 |
| CN | 101213285 | B | 12/2011 |
| CN | 103131567 | A | 6/2013 |
| CN | 103146505 | A | 6/2013 |
| CN | 103224847 | A | 7/2013 |
| CN | 103525572 | A | 1/2014 |
| CN | 103710171 | A | 4/2014 |
| CN | 104388204 | A | 3/2015 |
| CN | 104593165 | A | 5/2015 |
| CN | 104694275 | A | 6/2015 |
| CN | 104694284 | A | 6/2015 |
| CN | 105002023 | A | 10/2015 |
| CN | 105176708 | B | 9/2017 |
| CO | 4180620 | A1 | 6/1995 |
| DE | 4324358 | A1 | 1/1994 |
| DE | 19806495 | C1 | 1/1999 |
| EP | 0560114 | B1 | 4/1996 |
| EP | 0796318 | B1 | 3/1999 |
| EP | 0929649 | B1 | 7/1999 |
| EP | 0929653 | B1 | 7/1999 |
| EP | 0891414 | B1 | 2/2002 |
| EP | 0859048 | B1 | 10/2003 |
| EP | 0844303 | B1 | 5/2005 |
| EP | 1767185 | A1 | 3/2007 |
| EP | 1767612 | A1 | 3/2007 |
| EP | 1767613 | A1 | 3/2007 |
| EP | 1914297 | A1 | 4/2008 |
| EP | 2072614 | A1 | 6/2009 |
| EP | 2589639 | A1 | 5/2013 |
| EP | 2851417 | A1 | 3/2015 |
| FR | 2736846 | A1 | 1/1997 |
| GB | 697315 | | 9/1953 |
| GB | 748881 | | 5/1956 |
| GB | 756334 | | 9/1956 |
| GB | 939902 | | 10/1963 |
| GB | 987795 | | 3/1965 |
| GB | 1255102 | A | 11/1971 |
| GB | 2271998 | A | 5/1994 |
| IN | 256323 | | 8/2007 |
| IN | 200700939 | P1 | 8/2007 |
| IN | 270229 | | 4/2010 |
| IN | 200903663 | P2 | 4/2010 |
| IN | 201001844 | P2 | 8/2010 |
| IN | 272345 | | 11/2010 |
| IN | 201001783 | P2 | 11/2010 |
| IN | 201202035 | P1 | 7/2015 |
| IN | 201501970 | P2 | 1/2016 |
| JP | S39014983 | B | 7/1964 |
| JP | H09241697 | A | 9/1997 |
| JP | 2000336391 | A | 12/2000 |
| JP | 2003192535 | A | 7/2003 |
| JP | 2003306695 | A | 10/2003 |

(56) References Cited

FOREIGN PATENT DOCUMENTS

| | | | | |
|---|---|---|---|---|
| JP | 20052337 | A | | 1/2005 |
| JP | 5129422 | B2 | | 1/2013 |
| KR | 20070017138 | A | | 2/2007 |
| KR | 20080067314 | A | | 7/2008 |
| KR | 101496624 | B1 | | 2/2015 |
| KR | 20150105379 | A | | 9/2015 |
| MX | 04010554 | A | | 1/2005 |
| MX | 2009007181 | A | | 7/2009 |
| MX | 2009004690 | A | | 2/2010 |
| MX | 2010014505 | A | | 2/2011 |
| MX | 2010014506 | A | | 2/2011 |
| MX | 2010014508 | A | | 2/2011 |
| MX | 2011009596 | A | | 10/2011 |
| MX | 2012007016 | A | | 7/2012 |
| MX | 2012007017 | A | | 7/2012 |
| MX | 2012007018 | A | | 7/2012 |
| MX | 2014006466 | A | | 9/2014 |
| MX | 2015003631 | A | | 6/2015 |
| RU | 2119000 | C1 | | 9/1998 |
| RU | 2123078 | C1 | | 12/1998 |
| WO | 9209679 | A1 | | 6/1992 |
| WO | 9218592 | A1 | | 10/1992 |
| WO | 9304154 | A1 | | 3/1993 |
| WO | 9506105 | A1 | | 3/1995 |
| WO | 9518211 | A1 | | 7/1995 |
| WO | 9518212 | A1 | | 7/1995 |
| WO | 9518214 | A1 | | 7/1995 |
| WO | 9600603 | A1 | | 1/1996 |
| WO | 9612003 | A1 | | 4/1996 |
| WO | 9617922 | A1 | | 6/1996 |
| WO | WO 9617922 | A1 | * | 6/1996 |
| WO | 9705232 | A1 | | 2/1997 |
| WO | 9733967 | A1 | | 9/1997 |
| WO | 9813453 | A1 | | 4/1998 |
| WO | 9814552 | A1 | | 4/1998 |
| WO | 9814556 | A1 | | 4/1998 |
| WO | 9820104 | A1 | | 5/1998 |
| WO | 9855581 | A1 | | 12/1998 |
| WO | 9907656 | A1 | | 2/1999 |
| WO | 9913044 | A1 | | 3/1999 |
| WO | 9919454 | A1 | | 4/1999 |
| WO | 9927044 | A1 | | 6/1999 |
| WO | 9938944 | A1 | | 8/1999 |
| WO | 9951364 | A1 | | 10/1999 |
| WO | 0017302 | A1 | | 3/2000 |
| WO | 0155287 | A1 | | 8/2001 |
| WO | 0164829 | A1 | | 9/2001 |
| WO | 0183660 | A1 | | 11/2001 |
| WO | 0185893 | A1 | | 11/2001 |
| WO | 0215849 | A2 | | 2/2002 |
| WO | 0222552 | A1 | | 3/2002 |
| WO | 02099027 | A2 | | 12/2002 |
| WO | 03039499 | A1 | | 5/2003 |
| WO | 2006020789 | A1 | | 2/2006 |
| WO | 2006125147 | A2 | | 11/2006 |
| WO | 2007020608 | A1 | | 2/2007 |
| WO | 2008047301 | A1 | | 4/2008 |
| WO | 2009010375 | A1 | | 1/2009 |
| WO | 2009059630 | A1 | | 5/2009 |
| WO | 2010018576 | A2 | | 2/2010 |
| WO | 2010073752 | A1 | | 7/2010 |
| WO | 2012010198 | A1 | | 1/2012 |
| WO | 2012084036 | A1 | | 6/2012 |
| WO | 2013036662 | A1 | | 3/2013 |
| WO | 2013088120 | A1 | | 6/2013 |
| WO | 2015018620 | A1 | | 2/2015 |

OTHER PUBLICATIONS

Queiros et al., "Characterization of walnut, almond, and pine nut shells regarding chemical composition and extract composition," Biomass Conversion and Biorefinery, Mar. 2020, vol. 10, pp. 175-188.

* cited by examiner

SOLIDIFYING LIQUID AMINE OXIDE, BETAINE, AND/OR SULTAINE SURFACTANTS WITH A BINDER AND OPTIONAL CARRIER

CROSS-REFERENCE TO RELATED APPLICATIONS

This application is a Divisional application of U.S. patent application Ser. No. 16/259,015 filed Jan. 28, 2019 (now U.S. Pat. No. 11,655,436, issued May 23, 2023), which claims priority under 35 U.S.C. § 119 to Provisional Application U.S. Ser. No. 62/622,356 filed Jan. 26, 2018, herein incorporated by reference in their entirety including without limitation, the figures, tables, examples, and claims.

This is application is related to Provisional Application U.S. Ser. No. 62/622,403 filed Jan. 26, 2018, and U.S. Pat. No. 11,214,763 issued Jan. 4, 2022, both of which are entitled "SOLIDIFYING LIQUID AMINE OXIDE, BETAINE, AND/OR SULTAINE SURFACTANTS WITH A CARRIER".

TECHNICAL FIELD

The disclosure relates to solidification of liquid amine oxide, sultaine, and/or betaine surfactants with a binder and optional carrier. In particular, it relates to solidification of liquid amine oxide, betaine, and sultaine surfactants utilizing drying device(s), wherein the feed composition contains at least one surfactant and a water soluble binder.

BACKGROUND

A number of amine oxide, betaine, and sultaine surfactants are available only in liquid form. It is desirable to provide many such surfactants in solid form in order to make solid cleaning compositions. Because many of these surfactants are only available in liquid form, they cannot easily be incorporated into solid formulations or are limited in the active concentration capable of being included in the formulation.

Attempts have been made in the past to include certain liquid surfactants in solid form; however, these have been largely unsuccessful for a variety of reasons. There has been an inability to convert liquid amine oxides, betaines, and sultaines to solid surfactants while maintaining the surfactant efficacy. This has resulted in less desirable performance of the solid cleaning compositions. Another problem has been that solidified amine oxide, betaine, and sultaine surfactants have often been found to be tacky and thus suffer from caking, compaction and agglomeration, which has made packaging, storage, proper dosing and dispersion in a manufacturing process difficult. Additionally, some methods for solidifying liquid amine oxides, betaines, and sultaines have required substantial amounts of binder and/or carrier thereby reducing the active concentration of the surfactant in the ultimate product. Other efforts to solidify liquid surfactants have been through the use of compounds that are not sufficiently water soluble, for example, having a solubility of about 0.2 g/L or less at 20° C., such as fumed silica; this is problematic for both formulation and ultimate end-use which is typically in water. Thus, there is need for improvement.

Accordingly, it is an objective of the claimed invention to develop solidified amine oxide, betaine, and/or sultaine compositions from liquid amine oxides, betaines, and/or sultaines and methods of making the same.

A further object of the invention is to provide solidified amine oxide, betaine, and/or sultaine compositions that are free flowing.

A further object of the invention is to provide cleaning compositions that include a solidified amine oxide, betaine, and/or sultaine composition.

Other objects, advantages and features of the present invention will become apparent from the following specification taken in conjunction with the accompanying drawings.

Figure 1:
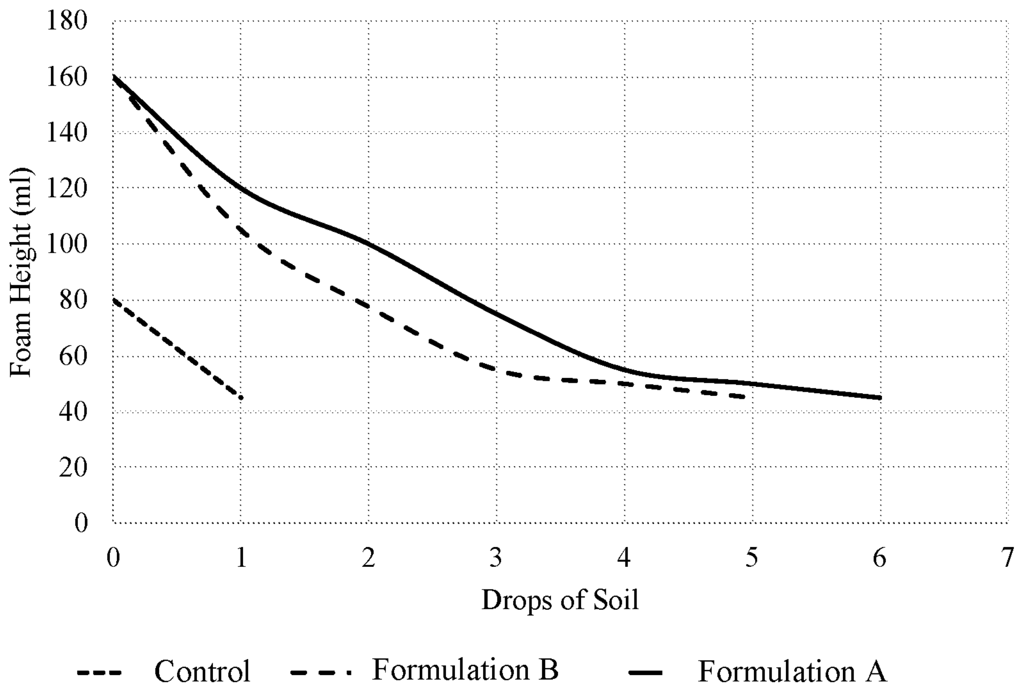
FIG. 1 shows a foam profile comparison of foam height versus drops of soil of a solid floorcare composition, the floorcare composition with liquid amine oxide, and the floorcare composition with solidified liquid amine oxide surfactant with urea as the binder.

Various embodiments will be described in detail with reference to the figures. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present disclosure relates to the solidification of liquid amine oxide, betaine, and/or sultaine surfactants with a binder and an optional carrier to form a solidified surfactant composition. The solidified surfactant compositions have many advantages over existing formulations including the same surfactants as those surfactants have been in liquid form, which has hindered or prohibited their use in certain types of solid formulations, including, but not limited to, pressed solids. For example, many amine oxides, betaines, and sultaines are found in liquid form and are currently limited by the solid actives commercially available. Conversion of liquid surfactants to solidified surfactant compositions enables their use in higher concentrations in solid compositions and expands their usefulness in solid formulations. Unexpectedly, it has been found that solidification of liquid amine oxide, betaine, and sultaine surfactants in the solidified surfactant compositions provides substantially similar performance with respect to foam and soil removal properties, which is an indicator of good overall surfactant performance. This demonstrates the usefulness of the solidified surfactant compositions in solid cleaning compositions, including, but not limited to, pressed solids.

The embodiments are not limited to particular method and/or product, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾ This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, and distance. Further, given solid and liquid handling procedures used in the real world, there is certain inadvertent error and variation that is likely through differences in the manufacture, source, or purity of the ingredients used to make the compositions or carry out the methods and the like. The term "about" also encompasses amounts that differ due to different equilibrium conditions for a composition resulting from a particular initial mixture. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof.

The term "laundry" refers to items or articles that are cleaned in a laundry washing machine. In general, laundry refers to any item or article made from or including textile materials, woven fabrics, non-woven fabrics, and knitted fabrics. The textile materials can include natural or synthetic fibers such as silk fibers, linen fibers, cotton fibers, polyester fibers, polyamide fibers such as nylon, acrylic fibers, acetate fibers, and blends thereof including cotton and polyester blends. The fibers can be treated or untreated. Exemplary treated fibers include those treated for flame retardancy. It should be understood that the term "linen" is often used to describe certain types of laundry items including bed sheets, pillow cases, towels, table linen, table cloth, bar mops and uniforms. The invention additionally provides a composition and method for treating non-laundry articles and surfaces including hard surfaces such as dishes, glasses, and other ware.

As used herein, the term "polymer" generally includes, but is not limited to, homopolymers, copolymers, such as for example, block, graft, random and alternating copolymers, terpolymers, and higher "x"mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "threshold agent" refers to a compound that inhibits crystallization of water hardness ions from solution, but that need not form a specific complex with the water hardness ion. Threshold agents include but are not limited to a polyacrylate, a polymethacrylate, an olefin/maleic copolymer, and the like.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the invention include polyethylene terephthalate (PET) polystyrene polyamide.

The terms "water soluble" and "water miscible" as used herein, means that the component (e.g., binder or solvent) is soluble or dispersible in water at about 20° C. at a concentration greater than about 0.2 g/L, preferably at about 1 g/L or greater, more preferably at 10 g/L or greater, and most preferably at about 50 g/L or greater.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods, systems, apparatuses, and compositions of the present invention may comprise, consist essentially of, or consist of the components and ingredients of the present invention as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Methods of Solidifying Surfactants

Drying as a process function is utilized to remove liquid from a liquid-solid system in order to produce a dry solid. While the liquid removed is generally water, other organic liquids may be removed via a drying process. Selection of a drying device and/or configuration is dependent on condition of the feed stream, the desired form of the product, temperature sensitivity of the feed in addition to general considerations of fluid mechanics, heat and mass transfer, chemical kinetics, and gas-solid interactions. Selection of the equipment is dependent on material properties, drying characteristics of the material, product quality, and dust/solvent recovery.

Drying devices are typically categorized in three ways. First, the mode of operation of the drying device/system is classified as batch or continuous drying. Generally, batch drying is employed when required production rates are 500 pounds of dried product per hour or less. Continuous drying is favorable when greater than 500 pounds of dried product per hour is required. Second, drying devices are categorized by the mode of heat transfer for moisture removal. Direct-heat dryers (also known as adiabatic or convective dryers) contact the material with hot gas with evaporates and removes moisture. When utilized in a continuous operation mode, gas streams may be designed to be countercurrently, concurrently, or in crossflow to the material. Indirect-heat dryers (also known as nonadiabatic dryers) provide heat through conduction and/or radiation from a hot surface. These dryers may be operated under a vacuum to lower the temperature at which moisture is evaporated. Third, dryers can also be classified based on the degree of agitation of the material. The feed may be either stationary or fluidized. Successful drying devices provide a transition zone at the entrance to atomize the fluid, or to premix it with recycled solids to enhance flow. In the instance the heat sensitive solids are present, dryers with precise temperature control and/or vacuum conditions may be favorable. As one of skill in the art would appreciate, solidification of surfactants and other useful detergent chemicals requires careful consideration and weighing of processing variables in order to select the appropriate drying device.

In an embodiment of the invention, the drying device is, for example, a continuous tunnel dryer, rotary dryer, vacuum dryer, tower contractor, vibrating conveyor contractor, drum dryer, screw conveyor dryer, fluidized bed, spouted bed, pneumatic conveyor, spray dryer, or combinations thereof. Drying devices may be placed in parallel or series wherein a series would include one or more drying devices. Preferred drying devices include, but are not limited to, a spray dryer and a fluidized bed (also referred to as a fluid bed).

In an embodiment of the invention, the solidified surfactant compositions contain less than about 10 wt-% water, preferably less than about 5 wt-% water, more preferably less than about 1 wt-% water, and most preferably less than about 0.5 wt. % water.

In a preferred embodiment of the invention, the methods according to the claimed invention provide a dried composition with at least about 10 wt. % active surfactants, preferably at least about 25 wt. %, preferably at least 40 wt. %, and more preferably at least 50 wt. %.

Spray Drying

In a preferred embodiment of the invention, the solidification of the liquid amine oxide, betaine, and sultaine surfactants is performed using a spray dryer. Spray dryers are compatible with slurries or solutions feeds and provide desirable evaporation for heat-sensitive materials and light and porous products. Spray dryer configurations can require verification of pressure effects on the liquid feed and the solid product in order for drying to take place without damage to the product. In general, a liquid or slurry is feed to the dryer process unit and is then sprayed as fine droplets into a hot gas stream. As such, the feed composition must be able to withstand pressures required for droplet formation. Once in the spray dryer, liquid vaporization occurs rapidly, while temperature of the product remains relatively low. In selecting and designing a process, the interactions between the gas-solid must also be considered. In particular, inlet and exit conditions of the solid as well as the flow capacity and residence time should be designed with regard to diffusion and heat transfer rates.

In an embodiment of the invention, the inlet temperature of the inlet feed ranges from about 20° C. to about 250° C., preferably from about 100° C. to about 250° C., and more preferably from about 150° C. to about 200° C. In a further embodiment of the invention, the outlet temperature, aspirator, and pump speed are dependent on the degradation of the surfactant while within the spray dryer.

The value of the outlet temperature can vary based on the degradation temperature of the components in the solidified surfactant composition. Thus, in certain embodiments, the temperature can be higher or lower than those set forth herein. However, in embodiments of the invention, the outlet temperature is less than about 150° C., more preferably between about 0° C. and about 120° C., most preferably between about 20° C. and about 100° C.

Fluidized Bed

In a preferred embodiment of the invention, the solidification of the liquid sulfate and sulfonate surfactants is performed using a fluidized bed, in which a dry powder may be fed to the bed upon which a liquid is applied, then dried with the hot gases. Without seeking to be limited by a particular configuration or theory of invention, a fluidized-bed dryer comprises of a fluidizing chamber in which wetted particles are fluidized by hot gases that are blown through a heater into a plenum chamber below the bed, then through a distributor plate fluidizing the particles above.

The fluidized bed can perform an agglomerating process that includes a solid binder and/or carrier, or a granulating process that includes only liquid ingredients. The agglomerating process uses a liquid addition to bind particles from a powder feed to form larger particles of a desired size and composition. A granulate process differs from the agglomerating process in that a powder feed is not required; rather the granulate process occurs by spraying a liquid coating continuously onto a seed material from the process to continually coat and dry the liquid to form solid granules of a desired size and composition. Further, we have found that the process can be performed without a seed material or in fact without any material in the bed. In an embodiment where no material is in the bed at the start of the process, the process may begin by granulating to form a seed material and then can continue by agglomerating or further granulating.

The air velocity within the fluidized bed is dependent on starting material characteristics, drying rate and the desired particle size and typically ranges from about 0.001 to about 1000 feet per second, preferably from about 0.01 to about 500 feet per second, more preferably from about 0.1 to about 100 feet per second, and most preferably from about 1 to about 60 feet per second.

Preferably, the liquid flow rate is between about 0.001 lb/min/lb of bed material and about 0.15 lb/min/lb of bed material, more preferably between about 0.01 lb/min/lb of bed material and about 0.10 lb/min/lb of bed material. In an embodiment, where the process begins without any starting material, including no seed material, it should be understood that the liquid flow rate on a mass per minute per mass of bed material initially is not calculable as there is zero starting bed material. However, there is bed material almost immediately after the process begins as material is added to the bed for the initial granulation. In such an embodiment, the ratio of added liquid to bed material is initially higher due to the lower amount of bed material. For example, a preferred liquid flow rate without any starting material in the bed is between about 0.1 lb/min/lb of bed material and about 2 lb/min/lb of bed material, more preferably between about 0.5 lb/min/lb of bed material and about 1.5 lb/min/lb of bed material.

Atomizing air pressure within the fluidized bed can be from about 0 to about 100 psig per nozzle, preferably from about 1 to about 75 psig per nozzle, and more preferably from about 10 to about 60 psig per nozzle.

Solidified Surfactant Compositions

A number of amine oxide, betaine and sultaine surfactants are available primarily in liquid form. It is desirable to provide many such surfactants in solid form. An embodiment of the invention is found in solidified amine oxide, betaine, and/or sultaine surfactant compositions. Another embodiment of the invention is found in methods of preparing solidified amine oxide, betaine and sultaine surfactants surfactant compositions. The solidified surfactant compositions comprise a liquid amine oxide, betaine and/or sultaine surfactant and a binder. Optionally, the solidified surfactant compositions can include a carrier and/or co-surfactant which is preferably in a solid form. Additional components may be present dependent on the desired properties of the solidified surfactant composition.

In an aspect of the invention, a carrier is added to a drying device with a binder to form a solidified surfactant composition. Liquid compositions fed to the selected drying device(s) of the present invention comprise at least one liquid surfactant and solid binder.

The solidified surfactant compositions are preferably a powder. Preferred powder forms, including, but are not limited to, agglomerated solids and granulated solids. Thus, in some embodiments, the solidified surfactant composition is an agglomerated solid or a granulated solid.

Binder

Suitable binders can liquid (aqueous or nonaqueous), semisolid, or solid. The solidified surfactant compositions include at least one binder. In an aspect of the invention the binder is a solid in brick, powder, granule, bead, and flake form. Preferably the binder is dissolved and then dried with the liquid surfactant. Preferred binders can include, but are not limited to, natural polymers urea, urea derivatives, organic salts (such as sodium acetate), inorganic salts (such as sodium salts and sulfate salts including magnesium sulfate and sodium sulfate), polyacrylates, PEGs, an alkali metal carbonate (including, but not limited to, sodium carbonate, potassium carbonate, bicarbonate, sesquicarbonate, and mixtures thereof) and combinations thereof. Preferred natural polymers include, but are not limited to, polysaccharides and derivatives thereof (e.g., gums, cellulose, cellulose esters, chitin, chitosan, starch, chemically modified starch, and combinations thereof), proteins (e.g., zein, whey, gluten, collagen), lignins, natural rubber, and combinations thereof. Preferably the PEG has a melting point of at least about 40° C., more preferably between about 42° C. and about 100° C. Preferred PEGs include PEG 1450, PEG 3350, PEG 4000, PEG 4600, and PEG 8000.

The binder and liquid surfactant can be added to the drying device in a suitable amount to achieve a solidified surfactant product. The amount of each ingredient may depend on the specific liquid surfactant being solidified, the binder being used, and any other optional ingredients that may also be included in the solidified surfactant product.

Preferably, the binder and surfactant are in a ratio of active amount of between about 5:1 and about 1:30; or between about 4:1 and about 1:15; or between about 3:1 and about 1:10, or between about 2:1 and about 1:2.

As one of the goals of this invention is to be able to incorporate liquid surfactants into solid cleaning compositions in solid form, having a higher concentration or ratio of surfactant to binder and other ingredients in the solidified surfactant composition is preferred. However, this is limited by desired physical characteristics of the solidified surfactant compositions. For example, in a preferred aspect of the invention the surfactant is a solidified granule and not a paste. In another preferred aspect of the invention, the solidified surfactant compositions have reduced tackiness or are not tacky, such that they are free flowing and do not cake, agglomerate or cake when stored.

Liquid Surfactants

A number of surfactants are available primarily in liquid form. It is desirable to provide many such surfactants in solid form. In an aspect of the invention, a liquid surfactant is added to a drying device with a binder to form a solidified surfactant composition. Any suitable liquid surfactants can be included in the solidified surfactant compositions. Preferred liquid surfactants include, but are not limited to, amine oxides, betaines, sultaines, and combinations thereof.

Amine oxides are tertiary amine oxides corresponding to the general formula:

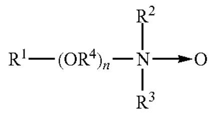

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 18 carbon atoms; $R^2$ and $R^3$ are alkyl or hydroxyalkyl of 1-3 carbon atoms or a mixture thereof, $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Suitable amine oxides can include those selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Betaine and sultaine surfactants are exemplary zwitterionic surfactants for use herein. A general formula for these compounds is:

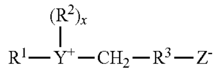

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

More specific betaine structures include:

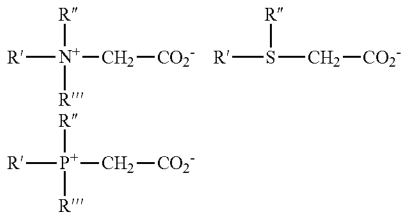

wherein R' contains an alkyl, alkenyl, or hydroxyalkyl radical of from 8 to 18 carbon atoms having from 0 to 10 ethylene oxide moieties and from 0 to 1 glyceryl moiety; R" is an alkyl or monohydroxy alkyl group containing 1 to 3 carbon atoms; R'" is an alkylene or hydroxy alkylene or hydroxy alkylene of from 1 to 4 carbon atoms. These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Suitable sultaines can include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

Carriers/Additional Ingredients

Optionally, in addition to the liquid surfactant and binder, a carrier or other solid materials may be included to aid in solidification or add functionality to the dried surfactant compositions. Examples of carriers include solid anionic surfactants, solid organic salts, and solid inorganic salts. Preferred anionic surfactants include, but are not limited to, alpha olefin sulfonate, linear alkyl sulfonate, an alkyl sulfate, sodium lauryl sulfate, sodium alkyl sulfate, and combinations thereof. Preferred organic salts include, but are not limited to, alkali and alkaline metal carbonates (such as sodium carbonate and magnesium carbonate), alkali and alkaline metal acetates (such as sodium acetate and magnesium acetate), and combinations thereof. Preferred inorganic salts include, but are not limited to, alkali and alkaline metal sulfates (such as sodium sulfate and magnesium sulfate), sodium chloride, and combinations thereof. Preferably, the carrier is a solid at room temperature; however, it can be in a dissolved liquid form for use in a granulating process.

Water and/or Water Miscible Solvent

Many of the liquid surfactants are in an aqueous medium and contain water content. Preferable aqueous mediums include water, water miscible, hydrogen peroxide, and mixtures thereof. In an aspect of the invention, the solidified surfactant compositions contain less than about 20 wt-% added water, preferably less than about 10 wt-% added water, more preferably less than about 5 wt-% added water, still more preferably less than about 1 wt-% added water, and most preferably less than about 0.5 wt. % added water. Added water refers to the amount of water added to the compositions, it does not include the amount of water present in other ingredients, such as alkalinity sources or surfactants. Preferably, the solidified surfactant compositions contain less than about 20 wt-% total water, preferably less than about 10 wt-% total water, more preferably less than about 5 wt-% total water, still more preferably less than about 1 wt-% total water, and most preferably less than about 0.5 wt. % total water. Total water refers to the water added to the composition and water present in other ingredients, such as alkalinity source or surfactants. It should be understood that the amount of added water and total water may depend on the type of solid composition being prepared as some methods require more water than others.

In another aspect of the invention, the methods according to the claimed invention provide at least about 30% of the liquid feed resulting in the solidified surfactant compositions, preferably from at least about 50%, more preferably at least about 65%, and most preferably at least about 85%. The liquid feed is the amount of liquid material added to the drying device by mass.

Solid Cleaning Compositions

The solidified surfactant compositions of the invention can be included in solid cleaning compositions. Those cleaning compositions can include, but are not limited to, detergent compositions, including, for example warewash compositions and laundry compositions; rinse aids; and hard surface cleaning compositions. Exemplary embodiments of those compositions are provided in Tables 1-3 below. Such compositions are exemplary and not limiting, for example, other cleaning compositions can be prepared with the solidified surfactant compositions of this disclosure, and the cleaning compositions reflected below are offered as examples of preferred formulations.

TABLE 1

Exemplary Manual Warewash Composition

| Ingredient | First Exemplary Range (wt. %) | Second Exemplary Range (wt. %) | Third Exemplary Range (wt. %) |
|---|---|---|---|
| Alkalinity Source | 0-10 | 0-5 | 1-10 |
| Surfactant | 30-95 | 40-90 | 40-90 |
| Builders/Stabilizing Agents | 0.1-40 | 0.1-30 | 0.1-40 |
| Water | 0-20 | 0.1-10 | 0.01-10 |

TABLE 2

Exemplary Laundry Composition

| Ingredient | First Exemplary Range (wt. %) | Second Exemplary Range (wt. %) | Third Exemplary Range (wt. %) |
|---|---|---|---|
| Alkalinity Source | 30-90 | 40-80 | 50-70 |
| Surfactant | 0.01-40 | 0.1-35 | 1-30 |
| Builders/Stabilizing Agents | 1-50 | 2-40 | 5-30 |
| Water | 0-20 | 0.01-10 | 0.1-10 |

TABLE 3

Exemplary Hard Surface Cleaning Composition

| Ingredient | First Exemplary Range (wt. %) | Second Exemplary Range (wt. %) | Third Exemplary Range (wt. %) | Fourth Exemplary Range (wt. %) |
|---|---|---|---|---|
| Surfactant | 1-20 | 1-10 | 30-95 | 30-95 |
| Builders/Stabilizing Agents | 0.01-30 | 0.1-40 | 0.1-40 | 0.1-40 |
| Alkalinity Source | 30-90 | 40-90 | 20-50 | 0-10 |
| Water | 0.01-20 | 0.1-10 | 0.01-10 | 0.01-10 |

In embodiments of the invention, additional ingredients can be included in the solid cleaning compositions. The additional ingredients provide desired properties and functionalities to the compositions. For the purpose of this application, the term "functional ingredient" includes a material that provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications. Examples of such a functional material include chelating/sequestering agents; bleaching agents or activators; sanitizers/anti-microbial agents; activators; builder or fillers; anti-redeposition agents; optical brighteners; dyes; odorants or perfumes; preservatives; stabilizers; processing aids; corrosion inhibitors; fillers; solidifiers; hardening agent; solubility modifiers; pH adjusting agents; humectants; hydrotropes; or a broad variety of other functional materials, depending upon the desired characteristics and/or functionality of the composition. In the context of some embodiments disclosed herein, the functional materials, or ingredients, are optionally included within the solid cleaning compositions for their functional properties. Some more particular examples of functional materials are discussed in more detail below, but it should be understood by those of skill in the art and others that the particular materials discussed are given by way of example only, and that a broad variety of other functional materials may be used.

In an aspect of the invention, some of the additional ingredients described below can be included in the solidified surfactant compositions. Preferred additional ingredients that can be incorporated into the solidified surfactant compositions include, but are not limited to, a co-surfactant, dye, and/or fragrance (odorant).

Acid Source

In some embodiments of the invention, a cleaning composition can include an acid source. Suitable acid sources, can include, organic and/or inorganic acids. Examples of suitable organic acids include carboxylic acids such as but not limited to hydroxyacetic (glycolic) acid, citric acid, formic acid, acetic acid, propionic acid, butyric acid, valeric acid, caproic acid, trichloroacetic acid, urea hydrochloride, and benzoic acid, among others. Organic dicarboxylic acids such as oxalic acid, malonic acid, gluconic acid, itaconic acid, succinic acid, glutaric acid, maleic acid, fumaric acid, adipic acid, and terephthalic acid among others are also useful in accordance with the invention. Any combination of these organic acids may also be used intermixed or with other organic acids which allow adequate formation of the composition of the invention.

Inorganic acids useful in accordance with the invention include sulfuric acid, sulfamic acid, methylsulfamic acid, hydrochloric acid, hydrobromic acid, and nitric acid among others. These acids may also be used in combination with other inorganic acids or with those organic acids mentioned above. In a preferred embodiment, the acid is an inorganic acid.

In some embodiments of the invention, a cleaning composition can have an acidic pH. In such an embodiment, the pH is preferably between 1 and 7. In another aspect of the invention, the acid source can be included as a pH modifier or neutralizer in a basic composition to achieve a desired pH.

Activators

In some embodiments, a cleaning composition can have improved the antimicrobial activity or bleaching activity by the addition of a material which, when the composition is placed in use, reacts with the active oxygen to form an activated component. For example, in some embodiments, a peracid or a peracid salt is formed. For example, in some embodiments, tetraacetylethylene diamine can be included within the composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof.

In some embodiments, an activator component can include in the range of up to about 75% by wt. of the cleaning composition, in some embodiments, in the range of about 0.01 to about 20% by wt., or in some embodiments, in the range of about 0.05 to 10% by wt. of the cleaning composition. In some embodiments, an activator for an active oxygen compound combines with the active oxygen to form an antimicrobial agent.

The activator can be coupled to solid cleaning compositions by any of a variety of methods for coupling one solid cleaning composition to another. For example, the activator can be in the form of a solid that is bound, affixed, glued or otherwise adhered to the solid cleaning composition. Alternatively, the solid activator can be formed around and encasing the solid cleaning composition. By way of further example, the solid activator can be coupled to the solid cleaning composition by the container or package for the composition, such as by a plastic or shrink wrap or film.

Alkalinity Source

The cleaning compositions can include an effective amount of one or more alkalinity sources. An effective amount of one or more alkaline sources should be considered as an amount that provides a composition having a pH between about 7 and about 14. In a particular embodiment the cleaning compositions can have a pH of between about 7.5 and about 13.5. During a wash cycle the use solution can have a pH between about 6 and about 14. In particular embodiments, the use solution can have a pH between about 6 and 14. If the cleaning composition includes an enzyme composition, the pH may be modulated to provide the optimal pH range for the enzyme compositions effectiveness. In a particular embodiment of the invention incorporating an enzyme composition in the cleaning composition, the optimal pH is between about 10 and about 11.

Examples of suitable alkaline sources of the cleaning composition include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources. Exemplary alkali metal carbonates that can be used include, but are not limited to, sodium carbonate, potassium carbonate, bicarbonate, sesquicarbonate, and mixtures thereof. Exemplary alkali metal hydroxides that can be used include, but are not limited to sodium, lithium, or potassium hydroxide. Exemplary metal silicates that can be used include, but are not limited to, sodium or potassium silicate or metasilicate. Exemplary metal borates include, but are not limited to, sodium or potassium borate.

Organic alkalinity sources are often strong nitrogen bases including, for example, ammonia (ammonium hydroxide), amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like.

In general, alkalinity sources are commonly available in either aqueous or powdered form. Preferably, the alkalinity source is in a solid form. The alkalinity can be added to the composition in any form known in the art, including as solid beads, granulated or particulate form, dissolved in an aqueous solution, or a combination thereof.

In general, it is expected that the cleaning compositions will include the alkalinity source in an amount between about 0.01% and about 99% by weight. In some embodiments, the alkalinity source will be between about 35% and about 95% by weight of the total weight of the cleaning composition. When diluted to a use solution, the compositions of the present invention can include between about 5 ppm and about 25,000 ppm of an alkalinity source.

Anti-Redeposition Agents

The cleaning compositions can optionally include an anti-redeposition agent capable of facilitating sustained suspension of soils in a cleaning or rinse solution and preventing removed soils from being redeposited onto the substrate being cleaned and/or rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A cleaning composition can include up to about 10 wt. %, and in some embodiments, in the range of about 1 to about 5 wt. %, of an anti-redeposition agent.

Bleaching Agents

The cleaning compositions can optionally include bleaching agent. Bleaching agent can be used for lightening or whitening a substrate, and can include bleaching compounds capable of liberating an active halogen species, such as $Cl_2$, $Br_2$, $—OCl^-$ and/or $—OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A cleaning composition may include a minor but effective amount of a bleaching agent, for example, in some embodiments, in the range of up to about 10 wt. %, and in some embodiments, in the range of about 0.1 to about 6 wt. %.

Chelating/Sequestering Agents

The cleaning compositions may also include effective amounts of chelating/sequestering agents, also referred to as builders. In addition, the cleaning compositions may optionally include one or more additional builders as a functional ingredient. In general, a chelating agent is a molecule capable of coordinating (i.e., binding) the metal ions commonly found in water sources to prevent the metal ions from interfering with the action of the other ingredients of a rinse aid or other cleaning composition. The chelating/sequestering agent may also function as a water conditioning agent when included in an effective amount. In some embodiments, a cleaning composition can include in the range of up to about 70 wt. %, or in the range of about 1-60 wt. %, of a chelating/sequestering agent.

Often, the cleaning composition is also phosphate-free and/or sulfate-free. In embodiments of the solid cleaning composition that are phosphate-free, the additional functional materials, including builders exclude phosphorous-containing compounds such as condensed phosphates and phosphonates.

Suitable additional builders include aminocarboxylates and polycarboxylates. Some examples of aminocarboxylates useful as chelating/sequestering agents, include, N-hydroxyethyliminodiacetic acid, nitrilotriacetic acid (NTA), ethylenediaminetetraacetic acid (EDTA), N-hydroxyethyl-ethylenediaminetriacetic acid (HEDTA), diethylenetriaminepentaacetic acid (DTPA), and the like. Some examples of polymeric polycarboxylates suitable for use as sequestering agents include those having a pendant carboxylate ($—CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

In embodiments of the solid cleaning composition which are not phosphate-free, added chelating/sequestering agents may include, for example a condensed phosphate, a phosphonate, and the like. Some examples of condensed phosphates include sodium and potassium orthophosphate, sodium and potassium pyrophosphate, sodium tripolyphosphate, sodium hexametaphosphate, and the like. A condensed phosphate may also assist, to a limited extent, in solidification of the composition by fixing the free water present in the composition as water of hydration.

In embodiments of the solid cleaning composition which are not phosphate-free, the composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt

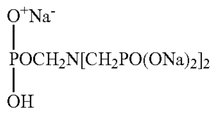

2-hydroxyethyliminobis(methylenephosphonic acid) $HOCH_2CH_2N[CH_2PO(OH)_2]_2$; diethylenetriaminepenta(methylenephosphonic acid) $(HO)_2POCH_2N[CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene) triamine(pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used.

For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein.

Dyes/Odorants

Various dyes, odorants including perfumes, and other aesthetic enhancing agents may also be included in the solid cleaning compositions. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the solid cleaning compositions include, for example, terpenoids such as citronellol, aldehydes such as amyl cinnamaldehyde, a jasmine such as C1S-jasmine or jasmal, vanillin, and the like.

Fillers

The solid cleaning compositions can optionally include a minor but effective amount of one or more of a filler. Some examples of suitable fillers may include sodium chloride, starch, sugars, $C_1$-$C_{10}$ alkylene glycols such as propylene glycol, sulfates, PEG, urea, sodium acetate, magnesium sulfate, sodium acetate, magnesium sulfate, sodium carbonate and the like. In some embodiments, a filler can be included in an amount in the range of up to about 50 wt. %, and in some embodiments, in the range of about 1-15 wt. %.

Functional Polydimethylsiloxones

The solid cleaning composition can also optionally include one or more functional polydimethylsiloxones. For example, in some embodiments, a polyalkylene oxide-modified polydimethylsiloxane, nonionic surfactant or a polybetaine-modified polysiloxane amphoteric surfactant can be employed as an additive. Both, in some embodiments, are linear polysiloxane copolymers to which polyethers or polybetaines have been grafted through a hydrosilation reaction. Some examples of specific siloxane surfactants are known as SILWET® surfactants available from Union Carbide or ABIL® polyether or polybetaine polysiloxane copolymers available from Goldschmidt Chemical Corp., and described in U.S. Pat. No. 4,654,161 which patent is incorporated herein by reference. In some embodiments, the particular siloxanes used can be described as having, e.g., low surface tension, high wetting ability and excellent lubricity. For example, these surfactants are said to be among the few capable of wetting polytetrafluoroethylene surfaces. The siloxane surfactant employed as an additive can be used alone or in combination with a fluorochemical surfactant. In some embodiments, the fluorochemical surfactant employed as an additive optionally in combination with a silane, can be, for example, a nonionic fluorohydrocarbon, for example, fluorinated alkyl polyoxyethylene ethanols, fluorinated alkyl alkoxylate and fluorinated alkyl esters.

Further description of such functional polydimethylsiloxones and/or fluorochemical surfactants are described in U.S. Pat. Nos. 5,880,088; 5,880,089; and 5,603,776, all of which patents are incorporated herein by reference. We have found, for example, that the use of certain polysiloxane copolymers in a mixture with hydrocarbon surfactants provides excellent rinse aids on plastic ware. We have also found that the combination of certain silicone polysiloxane copolymers and fluorocarbon surfactants with conventional hydrocarbon surfactants also provide excellent rinse aids on plastic ware. This combination has been found to be better than the individual components except with certain polyalkylene oxide-modified polydimethylsiloxanes and polybetaine polysiloxane copolymers, where the effectiveness is about equivalent. Therefore, some embodiments encompass the polysiloxane copolymers alone and the combination with the fluorocarbon surfactant can involve polyether polysiloxanes, the nonionic siloxane surfactants. The amphoteric siloxane surfactants, the polybetaine polysiloxane copolymers may be employed alone as the additive in cleaning compositions to provide the same results.

In some embodiments, the composition may include functional polydimethylsiloxones in an amount in the range of up to about 10 wt. %. For example, some embodiments may include in the range of about 0.1 to 10 wt. % of a polyalkylene oxide-modified polydimethylsiloxane or a polybetaine-modified polysiloxane, optionally in combination with about 0.1 to 10 wt. % of a fluorinated hydrocarbon nonionic surfactant.

Hardening/Solidification Agents/Solubility Modifiers

In some embodiments, one or more solidification agents may be included in the cleaning composition. Examples of hardening agents include urea, an amide such stearic monoethanolamide or lauric diethanolamide or an alkylamide, and the like; sulfate salts or sulfated surfactants, and aromatic sulfonates, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the active ingredients may be dispensed from the solid composition over an extended period of time.

Suitable aromatic sulfonates include, but are not limited to, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and/or sodium butyl naphthalene. Preferred aromatic sulfonates include sodium xylene sulfonate and sodium cumene sulfonate The amount of solidification agent included in a cleaning composition can be dictated by the desired effect. In general, an effective amount of solidification agent is considered an amount that acts with or without other materials to solidify the cleaning composition. Typically, for solid embodiments, the amount of solidification agent in a cleaning composition is in a range of about 10 to about 80% by weight of the cleaning composition, preferably in the range of about 20 to about 75% by weight more preferably in the range of about 20 to about 70% by weight of the cleaning composition. In an aspect of the invention, the solidification agent is substantially free of sulfate. For example, the cleaning composition may have less than 1 wt. % sulfate, preferably less than 0.5 wt. %, more preferably less than 0.1 wt. %. In a preferred embodiment the cleaning composition is free of sulfate.

In certain embodiments it can be desirable to have a secondary solidification agent. In compositions containing secondary solidification the composition may include a secondary solidification agent in an amount in the range of up to about 50 wt. %. In some embodiments, secondary hardening agents are may be present in an amount in the range of about 5 to about 35 wt. %, often in the range of about 10 to about 25 wt. %, and sometimes in the range of about 5 to about 15 wt.-%.

In some embodiments, one or more additional hardening agents may be included in the solid cleaning composition if desired. Examples of hardening agents include an amide such stearic monoethanolamide or lauric diethanolamide, or an alkylamide, and the like; a solid polyethylene glycol, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the ingredients may be dispensed from the solid composition over an extended period of time. The composition may include a secondary hardening agent in an amount in the range of up to about 30 wt. %. In some embodiments, secondary hardening agents are may be present in an amount in the range of about 5 to about 25 wt. %, often in the range of about 10 to about 25 wt. %, and sometimes in the range of about 5 to about 15 wt. %.

Humectant

The solid cleaning composition can also optionally include one or more humectants. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms "water solids filming" or "filming" refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the rinse agent composition can include humectant in an amount in the range of up to about 75% based on the total composition, and in some embodiments, in the range of about 5 wt. % to about 75 wt. % based on the weight of the composition.

Hydratable Salt

The solid cleaning compositions according to the invention can optionally comprise at least one hydratable salt. In an embodiment the hydratable salt is sodium carbonate (aka soda ash or ash) and/or potassium carbonate (aka potash). In a preferred aspect, the hydratable salt is sodium carbonate and excludes potassium carbonate. The hydratable salt can be provided in the ranges from between approximately 20% and approximately 90% by weight, preferably between approximately 25% and approximately 90% by weight, and more preferably between approximately 30% and approximately 70% by weight hydratable salt, such as sodium carbonate. Those skilled in the art will appreciate other suitable component concentration ranges for obtaining comparable properties of the solidification matrix.

In other embodiments, the hydratable salt may be combined with other solidification agents. For example, the hydratable salt may be used with additional solidification agents that are inorganic in nature and may also act optionally as a source of alkalinity. In certain embodiments, the secondary solidification agent may include, but are not limited to: additional alkali metal hydroxides, anhydrous sodium carbonate, anhydrous sodium sulfate, anhydrous sodium acetate, and other known hydratable compounds or combinations thereof. According to a preferred embodiment, the secondary hydratable salt comprises sodium metasilicate and/or anhydrous sodium metasilicate. The amount of secondary solidifying agent necessary to achieve solidification depends upon several factors, including the exact solidifying agent employed, the amount of water in the composition, and the hydration capacity of the other cleaning composition components. In certain embodiments, the secondary solidifying agent may also serve as an additional alkaline source.

Polymer

The cleaning compositions can include a polymer or a polymer system comprised of at least one polycarboxylic acid polymer, copolymer, and/or terpolymer. Particularly suitable polycarboxylic acid polymers of the present invention, include, but are not limited to, polymaleic acid homopolymers, polyacrylic acid copolymers, and maleic anhydride/olefin copolymers.

Polymaleic acid $(C_4H_2O_3)x$ or hydrolyzed polymaleic anhydride or cis-2-butenedioic acid homopolymer, has the structural formula:

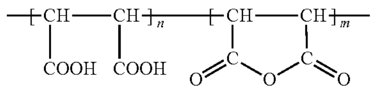

where n and m are any integer. Examples of polymaleic acid homopolymers, copolymers, and/or terpolymers (and salts thereof) which may be used for the invention are particularly preferred are those with a molecular weight of about 0 and about 5000, more preferably between about 200 and about 2000 (can you confirm these MWs). Commercially available polymaleic acid homopolymers include the Belclene 200 series of maleic acid homopolymers from BWA™ Water Additives, 979 Lakeside Parkway, Suite 925 Tucker, GA 30084, USA and Aquatreat AR-801 available from AkzoNobel. The polymaleic acid homopolymers, copolymers, and/or terpolymers may be present in cleaning compositions from about 0.01 wt. % to about 30 wt. %.

The cleaning compositions of the present invention can use polyacrylic acid polymers, copolymers, and/or terpolymers. Poly acrylic acids have the following structural formula:

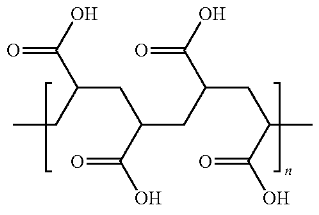

where n is any integer. Examples of suitable polyacrylic acid polymers, copolymers, and/or terpolymers, include but are not limited to, the polymers, copolymers, and/or terpolymers of polyacrylic acids, $(C_3H_4O_2)_n$ or 2-Propenoic acid, acrylic acid, polyacrylic acid, propenoic acid.

In an embodiment of the present invention, particularly suitable acrylic acid polymers, copolymers, and/or terpolymers have a molecular weight between about 100 and about 10,000, in a preferred embodiment between about 500 and about 7000, in an even more preferred embodiment between about 1000 and about 5000, and in a most preferred embodiment between about 1500 and about 3500. Examples of polyacrylic acid polymers, copolymers, and/or terpolymers (or salts thereof) which may be used for the invention include, but are not limited to, Acusol 448 and Acusol 425 from The Dow Chemical Company, Wilmington Delaware, USA. In particular embodiments it may be desirable to have acrylic acid polymers (and salts thereof) with molecular weights greater than about 10,000. Examples, include but are not limited to, Acusol 929 (10,000 MW) and Acumer 1510 (60,000 MW) both also available from Dow Chemical, AQUATREAT AR-6 (100,000 MW) from AkzoNobel Strawinskylaan 2555 1077 ZZ Amsterdam Postbus 75730 1070 AS Amsterdam. The polyacrylic acid polymer, copolymer, and/or terpolymer may be present in the compositions from about may be present in cleaning compositions from about 0.01 wt. % to about 30 wt. %.

Maleic anhydride/olefin copolymers are copolymers of polymaleic anhydrides and olefins. Maleic anhydride ($C_2H_2(CO)_2O$ has the following structure:

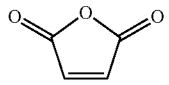

A part of the maleic anhydride can be replaced by maleimide, N-alkyl($C_{1-4}$) maleimides, N-phenyl-maleimide, fumaric acid, itaconic acid, citraconic acid, aconitic acid, crotonic acid, cinnamic 10 acid, alkyl ($C_{1-18}$) esters of the foregoing acids, cycloalkyl($C_{3-8}$) esters of the foregoing acids, sulfated castor oil, or the like.

At least 95 wt % of the maleic anhydride polymers, copolymers, or terpolymers have a number average molecular weight of in the range between about 700 and about 20,000, preferably between about 1000 and about 100,000.

A variety of linear and branched chain alpha-olefins can be used for the purposes of this invention. Particularly useful alpha-olefins are dienes containing 4 to 18 carbon atoms, such as butadiene, chloroprene, isoprene, and 2-methyl-1, 5-hexadiene; 1-alkenes containing 4 to 8 carbon atoms, preferably $C_{4-10}$, such as isobutylene, 1-butene, 1-hexene, 1-octene, and the like.

In an embodiment of the present invention, particularly suitable maleic anhydride/olefin copolymers have a molecular weight between about 1000 and about 50,000, in a preferred embodiment between about 5000 and about 20,000, and in a most preferred embodiment between about 7500 and about 12,500. Examples of maleic anhydride/olefin copolymers which may be used for the invention include, but are not limited to, Acusol 460N from The Dow Chemical Company, Wilmington Delaware, USA. The maleic anhydride/olefin copolymer may be present in cleaning compositions from about 0.01 wt. % to about 30 wt. %.

Sanitizers/Anti-Microbial Agents

The cleaning compositions can optionally include a sanitizing agent. Sanitizing agents also known as antimicrobial agents are chemical compositions that can be used in a solid functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action. Nonetheless, some embodiments incorporate additional antimicrobial agents.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three-log reduction of the microbial population results in a sanitizer composition. The antimicrobial agent can be encapsulated, for example, to improve its stability.

Some examples of common antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

In embodiments of the solid cleaning composition which are phosphate-free, and/or sulfate-free, and also include an anti-microbial agent, the anti-microbial is selected to meet those requirements. Embodiments of the solid cleaning composition which include only GRAS ingredients, may exclude or omit anti-microbial agents described in this section.

In some embodiments, the cleaning composition comprises, an antimicrobial component in the range of up to about 10% by wt. of the composition, in some embodiments in the range of up to about 5 wt. %, or in some embodiments, in the range of about 0.01 to about 3 wt. %, or in the range of 0.05 to 1% by wt. of the composition.

Additional Surfactants

The solidified surfactant compositions can include optional co-surfactants. Preferably, a co-surfactant is in solid form. Further, the solidified surfactant compositions of the invention can be incorporated in cleaning compositions. Those cleaning compositions can include, but are not limited to, detergent compositions, warewash compositions, laundry compositions, rinse aids, and hard surface cleaning compositions. Surfactants that can be included as a co-surfactant in the solidified surfactant compositions and/or as a surfactant in a cleaning composition, include, nonionic surfactants, semi polar nonionic surfactants, anionic surfactants, cationic surfactants, amphoteric surfactants, zwitterionic surfactants, and mixtures or combinations of the same.

When including a co-surfactant carrier in the solidified surfactant compositions of the invention, the co-surfactant is preferably in a weight ratio to the liquid surfactant between about 1:0 and about 0:1. In a further embodiment of the invention, the co-surfactant carrier is present in amount of about 20 wt. % to about 90 wt. %, more preferably from about 30 wt. % to about 90 wt. %, and more preferably from about 40 wt. % to about 80 wt. %.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound. One class of compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol™ manufactured by Shell Chemical Co. and Alfonic™ manufactured by Vista Chemical Co.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade name Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances.

Examples of nonionic low foaming surfactants include:

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

The alkylphenoxypolyethoxyalkanols of U.S. Pat. No. 2,903,486 issued Sep. 8, 1959 to Brown et al. and represented by the formula

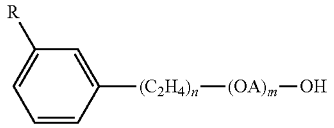

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof, $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or —$(C_2H_4O)_XH$, where x is in the range of from 1 to 3.

A useful class of non-ionic surfactants include the class defined as alkoxylated amines or, most particularly, alcohol alkoxylated/aminated/alkoxylated surfactants. These nonionic surfactants may be at least in part represented by the general formulae: $R^{20}$—$(PO)_SN$-$(EO)_tH$, $R^{20}$—$(PO)_SN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

Amine oxides are tertiary amine oxides corresponding to the general formula:

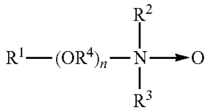

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof, $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyldimethylamine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

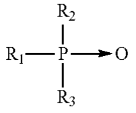

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

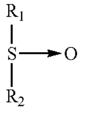

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates, such as Dehypon LS-54 ($R-(EO)_5(PO)_4$) and Dehypon LS-36 ($R-(EO)_3(PO)_6$); and capped alcohol alkoxylates, such as Plurafac LF221 and Tegoten EC11; mixtures thereof, or the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

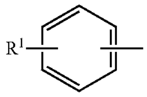, in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

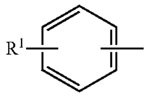

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

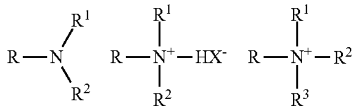

in which, R represents an alkyl chain, R', R", and R'" may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_m R^2_x Y_L Z$ wherein each $R^1$ is an organic group containing a straight or branched alkyl or alkenyl group optionally substituted with up to three phenyl or hydroxy groups and optionally interrupted by up to four of the following structures:

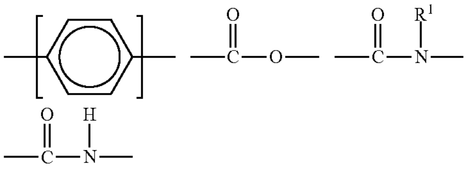

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

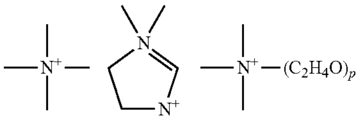

p = about 1 to 12

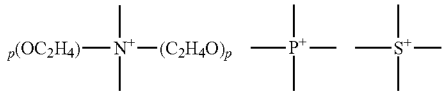

p = about 1 to 12

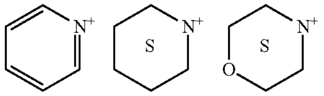

or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

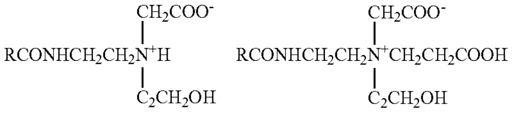

(MONO)ACETATE
Neutral pH Zwitternion (DI)PROPIONATE

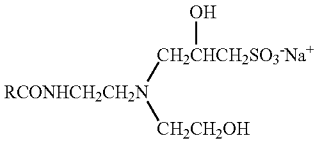

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines.

Betaines are a special class of amphoteric discussed herein below in the section entitled, Zwitterion Surfactants.

Long chain N-alkylamino acids are readily prepared by reaction $RNH_2$, in which R═$C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof, and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or $C_{12}$-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

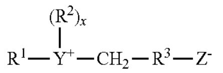

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

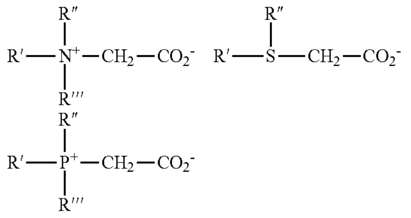

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Methods of Manufacturing Cleaning Compositions

The solidified surfactant compositions of the invention can be included in various cleaning compositions. Preferably, the cleaning compositions are solid compositions. Suitable solid cleaning compositions, include, but are not limited to granular and pelletized solid compositions, powders, solid block compositions, cast solid block compositions, extruded solid block composition, pressed solid compositions, and others. Preferably, the cleaning compositions are pressed solids.

Solid particulate cleaning compositions can be made by merely blending the dry solid ingredients formed according to the invention in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water soluble film containers. Other suitable packaging for the composition includes flexible bags, packets, shrink wrap, and water soluble film such as polyvinyl alcohol.

The solid cleaning compositions may be formed using a batch or continuous mixing system. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the cleaning composition hardens to a solid form. The structure of the matrix may be characterized according to its hardness, melting point, material distribution, crystal structure, and other like properties according to known methods in the art. Generally, a solid cleaning composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

In a pressed solid process, a flowable solid, such as granular solids or other particle solids are combined under pressure. In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 3000 psi, about 5 to about 2500 psi, or about 10 psi to about 2000 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g. granules) in contact with one another provides binding of particles to one another effective for making a stable solid composition. Inclusion of an optional curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid formulations for which there is a need for making solid cleaning compositions. Moreover, pressed solid compositions retain its shape under conditions in which the composition may be stored or handled.

By the term "solid", it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the cleaning composition under the expected conditions of storage and use of the solid cleaning composition. In general, it is expected that the cleaning composition will remain in solid form when exposed to temperatures of up to approximately 100° F. and particularly up to approximately 120° F.

The resulting solid cleaning composition may take forms including, but not limited to: a cast solid product; an extruded, molded or formed solid pellet, block, tablet, powder, granule, flake; pressed solid; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the composition have a weight of approximately 100 grams or greater, and solid block detergents formed by the composition have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

Liquid compositions can typically be made by forming the ingredients in an aqueous liquid or aqueous liquid solvent system. Such systems are typically made by dissolving or suspending the active ingredients in water or in compatible solvent and then diluting the product to an appropriate concentration, either to form a concentrate or a use solution thereof. Gelled compositions can be made similarly by dissolving or suspending the active ingredients in a compatible aqueous, aqueous liquid or mixed aqueous organic system including a gelling agent at an appropriate concentration. All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

The materials used in the following Examples are provided herein:

- Ammonyx LO (30%), a lauramine oxide available from Stepan Co.
- Amphosol CG, a cocamidopropyl betaine available from Stepan Co.
- Barlox 12, a cocoamine oxide available from Lonza.
- Mackam CB35, a coco-betaine available from Solvay.
- Mackam LSB50, a lauramidopropyl hydroxysultaine available from Rhodia.
- Mackam 50SB, a cocamidopropyl hydroxysultaine available from Rhodia.

Additional ingredients employed that are available from multiple commercial sources, included: lipase enzyme, polyether siloxanes, sodium alpha olefin sulfate, tartaric acid, tetrasodium EDTA, and urea (microprilled).

Example 1

Solidified Liquid Amine Oxide with Urea as Binder

Initial testing of a spray drying device was performed with an amine oxide mixed with urea in a 1:1 ratio by actives. The starting material and yield calculations are shown in Table 4.

TABLE 4

| | |
|---|---|
| Urea (g) | 120 |
| Amine Oxide, 30% (g) | 400 |
| Expected Yield (g) | 240 |
| Final Yield (g) | 89 |
| Percent Yield | 37.1 |
| Percent Active Amine Oxide | 50 |
| Percent Active Urea | 50 |

The resulting powders were then added to an exemplary solid floorcare formulation to observe foam-ability versus a control prepared with the liquid amine oxide surfactant in liquid form. The solid floorcare formulations for testing are shown in Table 5.

TABLE 5

| Component | Control | Formulation A | Formulation B |
|---|---|---|---|
| Solidified amine oxide | 0 | 12 wt. % | 0 |
| Surfactant Actives | 19.25 | 19.25 | 19.25 |
| Enzyme | 1 | 1 | 1 |
| Filler | 58.5 | 46.5 | 58.5 |
| pH adjustment | 3.75 | 3.75 | 3.75 |
| Chelant | 17.5 | 17.5 | 17.5 |
| | Each dissolved in water for testing. | | Dissolved in water with 18 wt. % liquid amine oxide added. |

The solidified amine oxide had a 50% active concentration. Thus, Formulation A had a 6% active concentration of amine oxide. A third formulation was prepared by dissolving the control composition in water and adding equivalent to 18 wt. % liquid amine oxide, which was a 30% active concentration to the dissolved floorcare composition. This provided the composition with 6% active amine oxide. Results of the drain foam-ability by determining drain fill time in seconds are shown in Table 6.

TABLE 6

| Solution Concentration | Drain Size | Control (seconds) | Formulation A (seconds) |
|---|---|---|---|
| 4 oz/gal | Square 9" × 9" | 38 | 21 |
| 4 oz/gal | Round 5" ID | 30 | 8 |
| 2 oz/gal | Square 9" × 9" | 34 | 22 |
| 2 oz/gal | Round 5" ID | 28 | 7 |
| 1 oz/gal | Square 9" × 9" | NA | 30 |
| 1 oz/gal | Round 5" ID | NA | 24 |

As shown in Table 6, Formulation A provided accelerated drain fill time when compared to solid formulations without surfactants dried according to the present invention.

Figure 2:
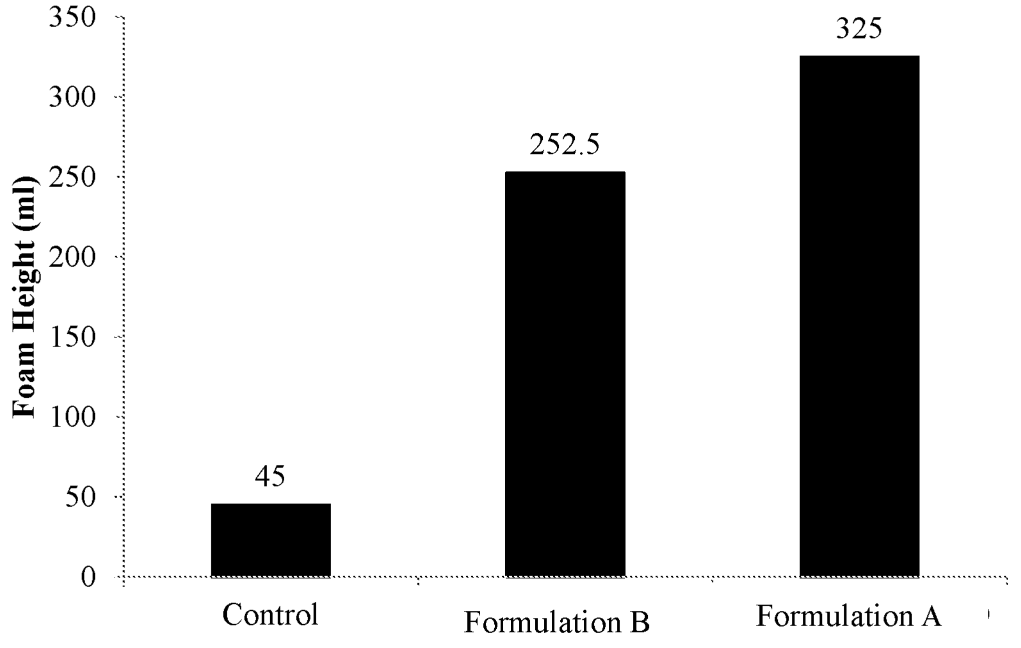
FIG. 2 shows a comparison of foam height of the floorcare composition, floorcare composition with liquid amine oxide, and floorcare composition with solidified liquid amine oxide surfactant with urea as the binder.

Additionally, the three compositions were tested for effective foaming in the presence of soil. To do this, the compositions were dissolved in water to form foam and drops of soil were added to the foaming compositions and the foam height was measured to provide a foam profile. Specifically, solutions of the compositions were prepared as described in Table 6 with 5 grain water at room temperature. 40 mLs of each solution was added to a separate 250 mL graduated cylinder. An exemplary institutional soil containing shortening, flour, powdered whole egg, and oleic acid was warmed to about 200° F. to liquefy the soil. The soil was added dropwise to each graduated cylinder. After the addition of the soil, the cylinders were rotated at 30 rpm for 4 minutes and the foam height was measured. The results of this test are shown in FIG. 1. Formulation A provided the best foam profile. The results of this testing are shown in FIG. 2. As can be seen in FIG. 2, Formulation A provided the best foam height.

Example 2

Solidified Amine Oxide with Sodium Acetate Binder

Initial testing of a spray drying device was performed with an amine oxide mixed with sodium acetate in a 2:1 ratio by actives. The starting material and yield calculations are shown in Table 7.

TABLE 7

| | |
|---|---|
| Sodium Acetate (g) | 30 |
| Amine Oxide, 30% (g) | 200 |
| Percent Active Amine Oxide | 66% |
| Percent Active Sodium acetate | 34% |

Figure 3:
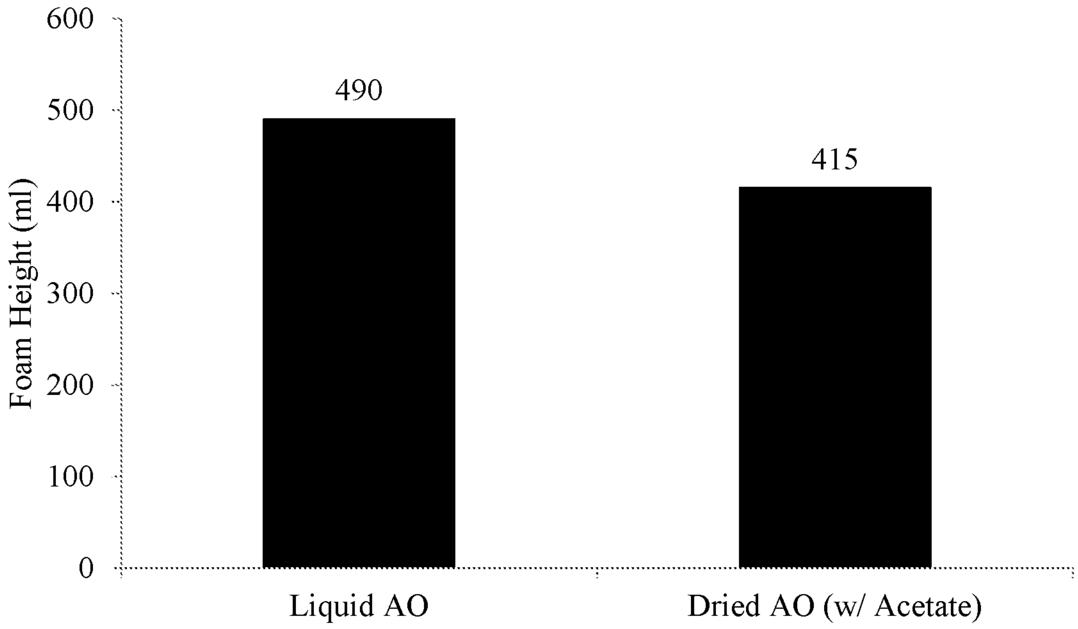
FIG. 3 shows a foam profile comparison of foam height versus drops of soil of two cleaning compositions. One formulation was an exemplary cleaning composition prepared with a liquid amine oxide surfactant solidified with sodium acetate as the binder. This formulation was compared with a control composition prepared with the amine oxide surfactant in its liquid form at 500 ppm active concentration.

The resulting powders were tested for effective foaming in the presence of soil. To do this, the liquid amine oxide was added to 40 mL of 5 grain water to provide an active concentration of about 500 ppm of the amine oxide and the foam height was measured. Additionally, the solidified amine oxide surfactant was dissolved in 40 mL of 5 grain water to provide an active concentration of about 500 ppm amine oxide and the foam height was measured. The results are shown in FIG. 3. As can be seen in FIG. 3, the solidified amine oxide provided almost the same foam height as the liquid amine oxide surfactant (490 mm to 415 mm). This indicates that the surfactant can be solidified as described herein without losing much foam ability.

Figure 4:
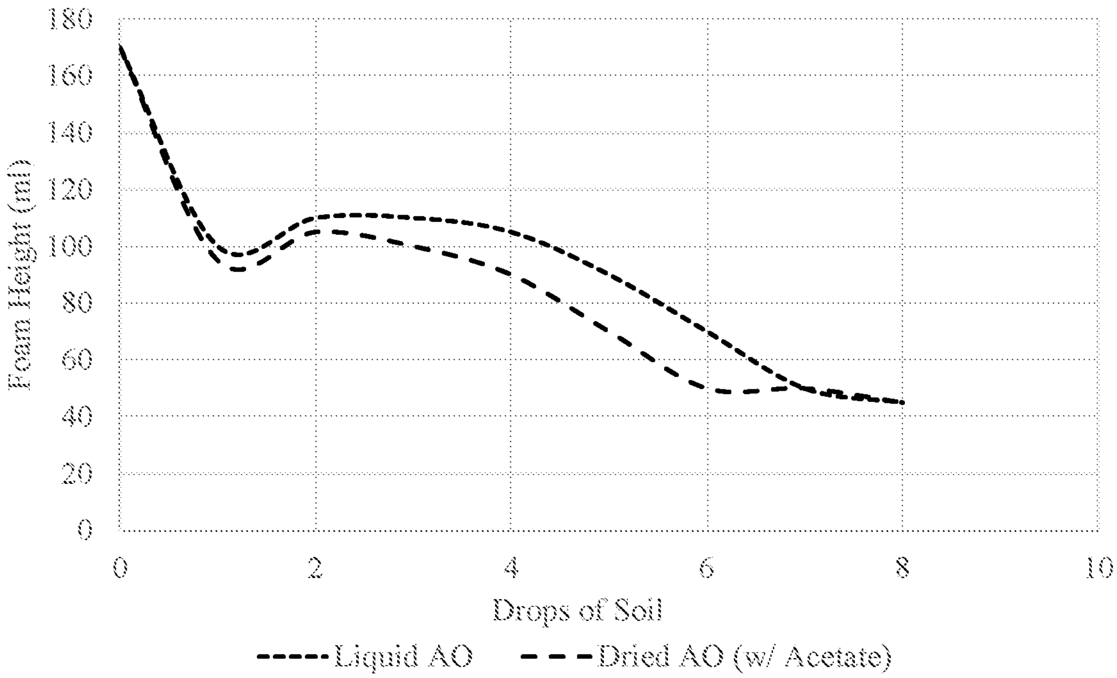
FIG. 4 shows a comparison of foam height of an exemplary solidified liquid amine oxide surfactant that was solidified with sodium acetate as the binder compared with the same amine oxide surfactant in liquid form at 500 ppm active.

The compositions were also tested and compared in the presence of oil. An exemplary institutional soil containing shortening, flour, powdered whole egg, and oleic acid was warmed to about 200° F. to liquefy the soil. The soil was added dropwise to each graduated cylinder. After the addition of the soil, the cylinders were rotated at 30 rpm for 4 minutes and the foam height was measured. The results of this test are shown in FIG. 4. The solidified amine oxide provided substantially similar foaming indicating that little to no foaming ability was lost by solidifying the liquid amine oxide surfactant.

Example 3

Solidified Liquid Surfactants with Binder and Carrier

Further tests were conducted with binder and the optional carrier in solidifying an exemplary amine oxide, betaine, and sultaine to assess the compatibility with both a binder and a carrier. Urea was employed as the binder. Alpha olefin sulfonate was employed as the carrier. The components were pumped into a lab scale fluidized bed according to the masses provided in Table 8. Other preparation conditions are shown in Table 8.

TABLE 8

| Component | Test A | Test B | Test C |
|---|---|---|---|
| Carrier (AOS (g)) | 417.31 | 403.70 | 467.20 |
| Surfactant | Cocamine oxide | Cocamidopropyl Hydroxysultaine | Cocamidopropyl Betaine |
| Surfactant Activity | 30% | 50% | 35% |
| LIQUID SURFACTANT/UREA COMPOSITION | | | |
| Surfactant (g) | 453.60 | 308.00 | 324.64 |
| Water (g) | 0.0 | 99.70 | 0.00 |
| Urea (g) | 136.10 | 153.00 | 97.85 |
| Total Liquid (g) | 589.70 | 560.70 | 422.49 |
| Active surfactant/urea in liquid Medium | 46.16% | 54.75 | 50.05 |
| POST DRYING RESULTS | | | |
| Remaining Liquid after drying (g) | 117.38 | 317.00 | 63.78 |
| Amount of surfactant/urea solution added (g) | 472.32 | 243.70 | 358.71 |
| FINAL COMPOSITION | | | |
| Activity of AOS | 59.12% | 57.54% | 65.01% |
| Activity of Surfactant | 17.16% | 12.46% | 14.92% |
| Activity of Urea | 17.16% | 12.38% | 12.85% |
| Filler/other ingredients | 6.57% | 7.52% | 7.22% |
| Comments | Powders were flowable once cooled to room temperature | Allowed powders to cool before it was sampled | Allowed powders to cool before it was sampled |

The dried powders according to Table 8 were then tested for foam height in comparison to dosed concentrations without the dried products. This confirmed the ability to solidify multiple classes of surfactants (amine oxides, betaines, and sultaines) according to the methods described herein and with a binder and a carrier.

A soil was prepared with 45% shortening, 30% flour, 15% powdered whole egg, and 10% oleic acid. Foam was prepared by mixing the surfactants and measuring the foam volume. The soil was added dropwise and the foam volume was continually measured to assess the performance of the surfactant in the presence of soil. The data is provided in Table 9 below. Once the measurement reached 45 mLs, no further measurements were taken (this is represented by n/a).

TABLE 9

| | Foam Volume (mL) with Oil Drops | | | | | |
|---|---|---|---|---|---|---|
| Surfactant | 0 | 2 | 4 | 6 | 8 | 10 |
| Cocamine oxide | 220 | 190 | 150 | 70 | 50 | 45 |
| (solidified) | 210 | 180 | 140 | 70 | 50 | 45 |
| Cocamine oxide | 220 | 200 | 160 | 90 | 50 | 45 |
| (dosed) | 220 | 200 | 150 | 80 | 50 | 45 |
| Cocamidopropyl | 220 | 200 | 150 | 50 | 45 | n/a |
| Hydroxysultaine | 220 | 200 | 160 | 60 | 45 | n/a |
| (solidified) | | | | | | |
| Cocamidopropyl | 220 | 190 | 150 | 50 | 45 | n/a |
| Hydroxysultaine | 220 | 190 | 150 | 50 | 45 | n/a |
| (dosed) | | | | | | |
| Cocamidoproyl | 210 | 170 | 100 | 50 | 45 | n/a |
| Betaine (solidified) | 210 | 200 | 120 | 50 | 45 | n/a |
| Cocamidoproyl | 210 | 160 | 80 | 50 | 45 | n/a |
| Betaine (dosed) | 210 | 170 | 100 | 50 | 45 | n/a |

As can be seen in Table 9, each class of solidified surfactant performed very similarly to the liquid dosed surfactants. Many of the surfactants had identical initial foam values and if not, had very close foam values. Further, the performance over the increasing addition of soil was substantially similar if not the same or improved. This demonstrates that each of the classes of surfactants can be solidified as described herein in a solidified surfactant composition having high active concentrations and while retaining the desired properties of the surfactants.

The features disclosed in the foregoing description, figures, or the following claims, expressed in their specific forms or in terms of a means for performing the disclosed function, or a method or process for attaining the disclosed result, as appropriate, may, separately, or in any combination of such features, be utilized for realizing the invention in diverse forms thereof.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method of solidifying a liquid surfactant comprising:
- dissolving a solid binder comprising a cellulose with a liquid surfactant comprising one or more of an amine oxide, a betaine, and a sultaine;
- adding the liquid surfactant and the dissolved binder to a first drying device comprising a fluidized bed;
- drying the liquid surfactant and binder to form the solidified surfactant composition; and
  - wherein the solidified surfactant composition has less than about 5 wt-% water.

2. The method of claim 1, further comprising adding the surfactant composition to a second drying device; wherein the second drying device comprises a continuous tunnel dryer, rotary dryer, vacuum dryer, tower contractor, vibrating conveyor contractor, drum dryer, screw conveyor dryer, a second fluidized bed, spouted bed, pneumatic conveyor, spray dryer, or a combination thereof.

3. The method of claim 2, wherein there are first and second drying devices placed in series or in parallel.

4. The method of claim 1, wherein the drying process is performed in a batch system.

5. The method of claim 1, wherein the drying process is performed in a continuous system.

6. The method of claim 1, wherein the fluidized bed has an air velocity between about 1 and about 100 feet per second.

7. The method of claim 1, wherein the fluidized bed has a liquid flow rate between about 0.001 and about 0.15 lb/min per pound of bed material.

8. The method of claim 1, wherein the fluidized bed has an atomizing air pressure between about from 0 psig and about 100 psig per nozzle.

9. The method of claim 1, wherein the fluidized bed has an air velocity between about 1 and about 100 feet per second; wherein the fluidized bed has a liquid flow rate between about 0.001 and about 0.15 lb/min per pound of bed material; and wherein the fluidized bed has an atomizing air pressure between about from 0 psig and about 100 psig per nozzle.

10. The method of claim 1, wherein the method employs a granulating process.

11. The method of claim 1, wherein the method employs an agglomerating process.

12. The method of claim 1, wherein the liquid surfactant is dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide, 3-dodecoxy-2-hydroxypropyldi-(2-hydroxyethyl)amine oxide, or a combination thereof.

13. The method of claim 1, wherein the liquid surfactant is coconut acylamidopropyldimethyl betaine, hexadecyl dimethyl betaine, $C_{12-14}$ acylamidopropylbetaine, $C_{8-14}$ acylamidohexyldiethyl betaine, $C_{16-18}$ acylamidodimethylbetaine, $C_{12-16}$ acylamidopentanediethylbetaine, $C_{12-16}$ acylmethylamidodimethylbetaine, or a combination thereof.

14. The method of claim 1, wherein the liquid surfactant is a compound having the formula $R(R^1)_2N{+}R^2SO^{3-}$, wherein R is a $C_6$-$C_{18}$ hydrocarbyl group, wherein $R^1$ is a $C_1$-$C_3$ alkyl, and wherein $R^2$ is a $C_1$-$C_6$ hydrocarbyl group.

15. The method of claim 1, wherein the binder further comprises urea, a urea derivative, sodium acetate, sodium chloride, sodium sulfate, magnesium sulfate, an alkali metal carbonate, gum, a cellulose ester, a chitin, a chitosan, a starch, a chemically modified starch, a protein, a lignin, a natural rubber, or a combination thereof.

16. The method of claim 1, further comprising adding a carrier to the drying device with the liquid surfactant and the binder, wherein the binder and carrier in the solidified surfactant composition have a water solubility of about 0.2 g/L or more at 20° C.

17. The method of claim 16, wherein the carrier is a solid anionic surfactant, a solid organic salt, a solid inorganic salt, or a combination thereof comprising one or more of alpha olefin sulfonate, linear alkyl sulfonate, sodium lauryl sulfate, sodium alkyl sulfate, sodium carbonate, magnesium carbonate, sodium acetate, magnesium acetate, sodium sulfate, magnesium sulfate, or sodium chloride.

18. The method of claim 1, further comprising adding a solidification agent to the drying device with the liquid surfactant and the binder, wherein the solidified surfactant composition is a granular solid, pelletized solid, cast solid, extruded solid block, or pressed solid.

19. The method of claim 12, wherein the solidified surfactant composition contains at least about 10 wt. % active surfactants.

20. A method of preparing a solid detergent and/or rinse aid composition comprising:

solidifying a liquid surfactant according to the method of claim 1 to form a solidified surfactant composition;

mixing the solidified surfactant composition with at least one additional ingredient to form a mixture; wherein the at least one additional ingredient comprises an alkalinity source, an acid source, an activator, an additional surfactant, an anti-redeposition agent, a bleaching agent, a chelating agent, a dye, an odorant, a filler, a functional polydimethylsiloxone, a hardening agent, a hydratable salt, a polymer, a sanitizer, or a mixture thereof pressing, casting, molding, or extruding the mixture to form the solid detergent and/or rinse aid.

21. The method of claim 20, wherein the alkalinity source is selected from the group consisting of an alkali metal hydroxide, an alkali metal carbonate, a metal silicate, a metal borate, an alkanolamine, and combinations thereof.

22. The method of claim 20, wherein the additional surfactant is selected from the group consisting of nonionic surfactants, cationic surfactants, anionic surfactants, semipolar nonionic surfactants, amphoteric surfactants, zwitterionic surfactants, and combinations thereof.

* * * * *